G. H. NILES.
COMBUSTION APPARATUS AND GAS PRODUCER.
APPLICATION FILED FEB. 15, 1908.
1,078,160.
Patented Nov. 11, 1913.
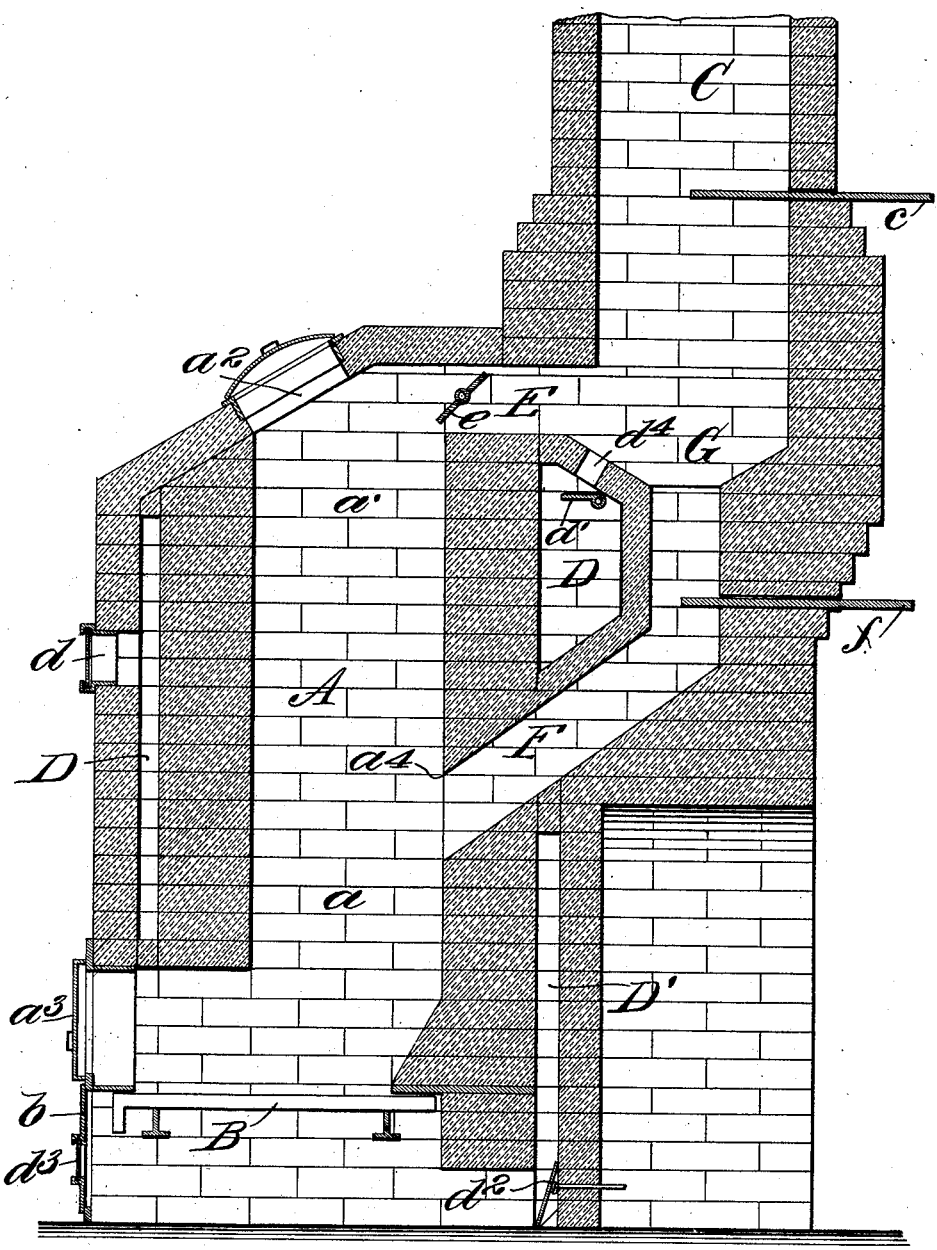
Witnesses:
Inventor
GLENN H. NILES
By his Attorney

UNITED STATES PATENT OFFICE.

GLENN H. NILES, OF ST. LOUIS, MISSOURI.

COMBUSTION APPARATUS AND GAS-PRODUCER.

1,078,160.   Specification of Letters Patent.   Patented Nov. 11, 1913.

Application filed February 15, 1908. Serial No. 416,035.

*To all whom it may concern:*

Be it known that I, GLENN H. NILES, a citizen of the United States of America, residing at the city of St. Louis, in the State of Missouri, have invented certain new and useful Improvements in Combustion Apparatus and Gas-Producers, of which the following is a full, clear, and exact description, reference being had to the accompanying drawing, forming part of this specification.

My invention relates to an apparatus for use in burning fuel without the production of smoke and in which I am able to carry out a method whereby smokeless combustion is secured by accomplishing, theoretically, complete combustion of the fuel. The apparatus is so constructed as to provide for the fuel being first reduced to a gaseous or volatile state and the gaseous or volatile matters to be immediately thereafter consumed before they become dissipated.

In the use of my apparatus, the fuel is first relieved of its volatile matters; the remainder of the fuel is then reduced to a non-combustible gas, and the volatile matters and such solid matters as they carry, are mixed with the non-combustible gases, which supply sufficient heat to the volatile matters to ignite them and maintain combustion. The necessary amount of oxygen to maintain complete combustion may be supplied in the fuel as the volatile matters are relieved therefrom, or the volatile matters removed from the fuel may be enriched by the mixing of oxygen therewith, after the volatile matters have been removed from the generator in which they are produced and are being consumed in the presence of the non-combustible gases that supply heat to them.

The drawing is a vertical section taken through my apparatus.

In the accompanying drawing: A designates the vertically arranged front generator or fire chamber of my apparatus, at the bottom of which is a grate B by which the fuel to be combusted is supported. The lower portion $a$ of the generator chamber serves as a combustion portion of the chamber, while the upper portion $a'$ serves as a carbonizing or coking portion of said chamber. Fuel is introduced into the generator A through the charging doorway $a^2$ located at the top of the generator chamber.

$a^2$ is a rake-out doorway immediately above the grate B.

$b$ is the ash-pit door which is provided with a front damper $d^3$ through which an auxiliary supply of air may be admitted to the ash-pit beneath the grate.

Separate from the generator chamber A is a mixing chamber G, which is adapted to receive the products of combustion from the combustion zone of the generator chamber, and also from the carbonization zone of said chamber, these products being mixed, and if desired, completely burned by a proper control of the air passages and flues to be hereinafter referred to. In the present embodiment, the mixing chamber G is disposed above and to one side of the generator chamber A, and is connected with the upper end of the carbonization zone by an upper flue E, through which the volatile matters and solid matters suspended therein may be carried into the mixing chamber. The passage of the volatile matters and solid matters through said upper flue is regulated by a damper or controlling device $e$.

F is a lower flue having a lower upwardly inclined portion and a vertical portion leading from the lower combustion portion $a$ of the generator chamber to the mixing chamber G, said flue being so located as to have communication with said combustion portion of the generator chamber at a dividing point beneath which combustion of fuel takes place and above which carbonization of the fuel occurs. The point just mentioned is designated in the drawings $a^4$. The lower flue F serves to conduct the non-combustible gases from the combustion portion $a$ of the generator chamber to the mixing chamber G, and the passage of the gases through the flue F is governed by a damper $f$ located across the vertical portion thereof.

A suitable draft producing means is included in my apparatus, the means I have shown for producing the draft being a chimney flue C which is controlled by a damper $c$ located across the lower portion thereof. Any other suitable means for producing the draft, such as a blower, may however, be employed in lieu of said chimney flue.

D designates an air supply chamber within the wall of my apparatus, in front of the generator chamber, into which air is admitted through a suitable front inlet $d$ that is controlled by a suitable damper. The air supply chamber which in addition to supplying air, serves to afford insulation and prevent radiation of heat units, extends into juxtaposition with the combustion chamber G at the rear and oxygen is supplied to said combustion chamber from said air chamber through a secondary upwardly inclined air port $d^4$, that is controlled by a damper $d'$. The air chamber D includes a lower air duct $D'$ at the rear of the front generator chamber that leads downwardly to the ash-pit and is controlled by a damper $d^2$ and through which air may be supplied to the lower combustion portion $a$ of the generator chamber.

In the practical use of my apparatus, fuel is charged into the upper or carbonizing portion of the generator chamber A, after a fire has been started in the lower or combustion portion $a$ of said chamber. Then the volatile matters in the fuel that has been charged into the carbonizing portion of the generator chamber are driven off and pass through the upper horizontal flue E, into the rear combustion chamber G. At the same time, the non-combustion gases formed by the fuel in the lower combustion portion $a$ of the generator chamber pass upwardly through the lower flue F and mix with the volatile matters entering into the rear mixing chamber G, to supply the necessary heat for the ignition and complete combustion of the volatile matters. A sufficient amount of air to maintain combustion in the rear mixing chamber G may be delivered to said rear combustion chamber by feeding an excess of air through the generator chamber, admitted either through the damper $d^3$ in the ash-pit door or through the air chamber duct $D'$, or the air to maintain combustion in said mixing chamber may be admitted directly into the chamber from the air chamber D, through the port $d^4$.

The fuel in the upper portion $a'$ of the generator chamber carbonizes during the operation of the apparatus and descends in the generator chamber to the lower combustion portion $a$ of the chamber to become combusting fuel and be consumed as rapidly as the previously coked and lower fuel becomes consumed in the lower combustion portion of the chamber.

It will be appreciated that the apparatus described herein may be used as a gas producer by admitting no air, or an insufficient supply of air, to support complete combustion in the mixing chamber G. In operating the apparatus as a gas producer, the various gases delivered from the several zones in the generator meet in the chamber G and are there mixed and transformed into a fixed gas in the presence of the intense heat derived from the parts of combustion from the combustion zone $a$. It is thus intended to utilize, as far as possible, the heat contained in the products of combustion to form a fixed gas in the mixing chamber, which is provided for this purpose; said mixing chamber being disposed between the generator and the point at which the gases are to be consumed. It is a well-known fact that a hydrocarbon gas containing free carbon, oily vapors, and tar in suspension (these being the products of carbonization) may be mixed with carbon dioxid and nitrogen when sufficiently heated to form a fixed gas, the free carbon and some of the oily vapors and tar becoming incandescent, so that the oil and tar become gasified and fixed. Any free carbon which does not become embodied in the fixed gas will unite with the carbon dioxid to form two parts of carbon monoxid which, of course, is not a fixed gas and is preferably but a small percentage of the gases present in the mixture.

I claim:

A combustion apparatus comprising a generator chamber having a lower combustion zone and an upper carbonization zone, a top charging doorway, a grate at the bottom of the generator chamber, an ash pit, a mixing chamber above, and separate from, the generator chamber, an upper horizontal flue leading from the upper carbonization zone to the mixing chamber, a lower flue having a lower upwardly inclined portion and a vertical portion and leading from the lower combustion zone to the said mixing chamber, an air supply chamber within the wall of the apparatus, in front of the generator chamber and discharging through an upwardly inclined port into said mixing chamber, and a lower air duct at the rear of the generator chamber leading to the ash pit.

In testimony whereof, I have hereunto set my hand this twelfth day of February, 1908.

GLENN H. NILES.

In the presence of —
LILY ROST,
BLANCHE HOGAN.

---

Copies of this patent may be obtained for five cents each, by addressing the "Commissioner of Patents, Washington, D. C."